United States Patent [19]

Chen

[11] Patent Number: 5,283,003

[45] Date of Patent: Feb. 1, 1994

[54] BLOWING AGENTS FOR FOAMING POLYURETHANE HAVING NO OZONE DEPLETION POTENTIAL AND USES AND PREPARATIONS THEREOF

[76] Inventor: Wen-Pin Chen, 4070-4A Three Oaks Blvd., Troy, Mich. 48098

[21] Appl. No.: 26,506

[22] Filed: Mar. 4, 1993

[51] Int. Cl.⁵ .............................. C09K 3/00; C08J 9/14
[52] U.S. Cl. .................................. 252/350; 252/182.2; 252/182.24; 521/130; 521/131; 521/155
[58] Field of Search ............... 521/130, 131, 155; 252/350, 182.2, 182.24

[56] References Cited

U.S. PATENT DOCUMENTS

| | | | |
|---|---|---|---|
| 4,055,521 | 10/1977 | Taub et al. | 252/DIG. 9 |
| 4,381,353 | 4/1983 | McDaniel | 521/131 |
| 4,699,931 | 10/1987 | Fuzesi et al. | 521/117 |
| 4,917,778 | 4/1990 | Takada et al. | 201/32.1 |
| 5,084,486 | 1/1992 | Patten et al. | 521/126 |
| 5,084,487 | 1/1992 | Becker et al. | 521/163 |
| 5,114,980 | 5/1992 | Lii et al. | |
| 5,122,547 | 6/1992 | Becker et al. | 521/167 |
| 5,153,235 | 10/1992 | Becker et al. | 564/384 |

*Primary Examiner*—Morton Foelak
*Attorney, Agent, or Firm*—Gifford, Groh, Sprinkle, Patmore and Anderson

[57] ABSTRACT

A blowing agent composition and method of use that is not destructive to the ozone while producing a polyurethane integral skin foam product having high dimensional stability with minimal or no shrinkage. The blowing agent of the present invention is comprised of specific ratios of two or more components having no known ozone depleting characteristics. The components include methylene chloride, methyl formate, and one or more of n-pentane, isopentane, and cyclopentane. In one embodiment, the resulting product also demonstrates fire retardancy.

19 Claims, No Drawings

BLOWING AGENTS FOR FOAMING POLYURETHANE HAVING NO OZONE DEPLETION POTENTIAL AND USES AND PREPARATIONS THEREOF

BACKGROUND OF THE INVENTION

I. Field of the Invention

This invention relates to the preparation of blowing agents and method of use thereof for foaming polyurethane. More particularly, the present invention relates to blowing agents having no known ozone depletion potential and having high dimensional stability. In addition, the present invention relates to a blowing agent that is usable in the production of a product having excellent fire retardancy.

II. Background of the Invention

There are several known blowing agents for the foaming of polyurethanes. One such agent is water. When water is used, a polyether such as polypropylene glycol is treated with a diisocyanate in the presence of some water and a catalyst (amines, tin soaps, organic tin compounds). As the polymer forms, the water reacts with the isocyanate groups to cause crosslinking, and also produces carbon dioxide which causes foaming.

The resulting foamed polyurethane was then covered with a polyvinylchloride synthetic material to create, for example, automobile components such as dash boards, handles and bumpers. This is a two-step process—the creation of the foam and the addition of the cover.

While this two-step process has been effective, it is time-consuming. As an alternative, a one-step process was developed in which an integral skin was formed on the polyurethane foam. However, in the one-step process, conventional blowing agents such as water did not work effectively because the skin did not form properly, and alternative agents were necessary.

The blowing (and bonding) agents of choice, until 1979, have been chlorofluorocarbons. This group comprises any of several compounds comprised of carbon, fluorine, chlorine and hydrogen, were commonly used as blowing agents. While safer and more efficient than other propellant gases, their use was prohibited in that year because of their depleting effect on stratospheric ozone. The most popular of these gases were dichlorodifluoro-methane (CFC-11) and dichlorodifluoromethane (CFC-12).

As alternates to the chlorofluorocarbons, other blowing agents such as the two-carbon hydrogen-containing halocarbons, or HCFC's. Such a composition and method are disclosed in U.S. Pat. No. 5,114,980 issued in 1992 to Lii et al. These alternatives have been found useful because they allegedly have lower ozone depleting characteristics. While an improvement over chlorofluoro-carbons, the HCFC's are still troublesome because they nevertheless deplete the ozone, even though to a lesser degree. The phaseout of such chemicals is inevitable because of their environmentally destructive character.

Other blowing agents that do not have ozone-destroying effect are known. One such common alternative is methylene chloride, and another known blowing agent is methyl formate, derived by heating methyl alcohol with sodium formate and hydrochloric acid. Also, pentane is known for use in expanded polystyrenes.

However, while offering advantages with respect to the minimal harm on the environment, these alternatives suffer from product shrinkage. Specifically, after the article is created and the foam is allowed to set, shrinkage begins almost immediately after setting. This is especially true in the case of products manufactured from enriched foams.

OBJECT OF THE INVENTION

Accordingly, it is desirable to provide a blowing agent for use in the production of polyurethane integral skin foam in a one-step process using a practical, ozone-saving component. Furthermore, it is desirable to provide such a blowing agent that is cost-effective. In addition, it is desirable to provide a blowing agent where the resulting product demonstrates dimensional stability to resist shrinkage.

Furthermore, it is desirable to provide a blowing agent for use in production of molded polyurethane foam and foam articles in accordance with automotive industry specifications and in accordance with the demands of other applications requiring integral skin foam products.

It is an additional object of the present invention to provide a composition using the blowing agent of the present invention to produce a polyurethane integral skin foam product having excellent fire retardancy characteristics.

SUMMARY OF THE PRESENT INVENTION

The present invention discloses a blowing agent composition and method of use that overcomes the previously known problems. Specifically, the present invention provides a blowing agent that is not destructive to the ozone while producing a product that has high dimensional stability resulting in minimal or no shrinkage.

More particularly, the present invention discloses a blowing agent and methods of formulation that is comprised of specific ratios of two or more components having no known ozone depleting characteristics. These components include methylene chloride, methyl formate, and five compound hydrocarbons including n-pentane, isopentane, and their cyclic analog, cyclopentane.

Other objects and details of the present invention will become apparent from the following detailed description.

DETAILED DESCRIPTION OF THE PREFERRED EMBODIMENT OF THE PRESENT INVENTION

A. Blowing Agent Preparation and Composition

At the heart of the present invention is the blowing agent and its preparation. The preparation aspect and the selected components are crucial to overcome the problems commonly associated with the production of polyurethane integral skin foam.

The process of the present invention involves the preparation of a blowing agent without utilizing ozone-depleting components. The process of the present invention further involves the preparation of a polyurethane integral skin foam using the blowing agent prepared in accordance with procedures that follow.

1. Prior Uses of Select Components

As has been noted, methylene chloride ($CH_2Cl_2$, methylene dichloride, dichloromethane) has by itself been used as a blowing agent in the past. However, and also as noted, the resulting product is very susceptible to shrinkage. The following example illustrates the problem:

EXAMPLE—Methylene chloride as Blowing Agent

The following procedures and steps were used to prepare a polyurethane integral skin foam using methylene chloride as the blowing agent.

A mixture was prepared containing 90 parts of Voranol 5148 (trademark, Dow Chemical, Midland, Mich.), 5 parts of Voranol 490 (trademark, Dow Chemical), 5 parts of 1,4-butanediol (1,4-butylene glycol) (supplied by DuPont), 0.4 parts of DC5258 (Air Product, Allentown, Pa.), 0.8 parts of Dabco 33LV (trademark, Air Product), 0.6 parts of PC-41 (Air Product), and 10 parts of methylene chloride as the blowing agent. This mixture comprised Part A.

To Part A was added Isonate 2143L (trademark, Dow Chemical). The resulting foam was allowed to set. The set product demonstrated poor dimensional stability as it had a foam shrinkage of more than 20%.

As has also been noted, methyl formate ($HCOOCH_3$) has by itself been used as a blowing agent in the past. However, and again as also noted, the resulting product is very susceptible to shrinkage. The following example illustrates the problem:

EXAMPLE—Methyl Formate as Blowing Agent

The following procedures and steps were used to prepare a polyurethane integral skin foam using methyl formate as the blowing agent.

A mixture was prepared containing 90 parts of Voranol 5148, 5 parts of Voranol 490, 5 parts of 1,4-butanediol, 0.4 parts of DC5258, 0.8 parts of Dabco 33LV, 0.6 parts of PC-41, and 8 parts of methyl formate as the blowing agent. This mixture comprised Part A.

To Part A was added Isonate 2143L and the resulting foam was allowed to set. The set product demonstrated poor dimensional stability as it had a foam shrinkage of more than 10%.

As illustrated, the use of known blowing agents such as methylene chloride and methyl formate have failed to provide satisfactory resistance to shrinkage.

2. The Components as Used in the Present Invention

Applicant has found that by combining certain components in certain ratios and according to certain procedures that a dimensionally stable product can be achieved. More particularly, applicant has also found that by adding a five component hydrocarbon to either methylene chloride or methyl formate, a rich foam is produced that is also very stable and resists shrinkage. Furthermore, applicant has found that by varying the ratios of the selected components, a variety of blowing agents were produced to achieve different levels of dimensional stability.

Specifically, applicant has found that combinations of two or more of methylene chloride, methyl formate, and one or more of n-pentane, isopentane, and cyclopentane resulted in blowing agents that provide dimensionally stable products.

In one embodiment, a blowing agent to produce dimensionally stable products without ozone-depleting characteristics results from the combination of methyl formate in the range of 20 to 80 percent by weight with one or more of n-pentane, isopentane, and cyclopentane in the range of 20 to 80 percent by weight.

In another embodiment, a blowing agent having the above-mentioned characteristics results from the combination of methyl formate in the range of 20 to 80 percent by weight and methylene chloride in the range of 20 to 80 percent by weight.

In a further embodiment, a blowing agent according to the present invention results from the combination of methylene chloride in the range of 20 to 80 percent by weight with one or more of n-pentane, isopentane, and cyclopentane in the range of 20 to 80 percent by weight.

In a last embodiment, a blowing agent according to the present invention results from the combination of methylene chloride in the range of 10 to 40 percent by weight, methyl formate in the range of 10 to 40 percent by weight, and one or more of n-pentane, isopentane, and cyclopentane in the range of 20 to 80 percent by weight.

In each above-described embodiment, a blowing agent capable of producing dimensionally stable products in the production of polyurethane integral skin foam was achieved. Furthermore, the blowing agents of the present invention exhibit no ozone-depleting effects.

The components may be combined in various ratios to achieve the preferred blowing agent. The blowing agent composition and the methods for preparing the same will be better understood from a consideration of the following examples.

EXAMPLE I

The present example discloses a blowing agent comprising quantities of methyl formate (the first component) with one or more of n-pentane, isopentane, or cyclopentane (the second component). The combination of components resulted in Part A. Part A was produced by mixing the components at various ratios within a temperature range of between −95 degrees centigrade to 40 degrees centigrade.

More particularly, the first component to the second component ratio was 50-50 percent by weight. The preferred temperature range was from −20 degrees centigrade to 40 degrees centigrade.

EXAMPLE II

The alternate example discloses a blowing agent comprising quantities of methyl formate (said first component) and methylene chloride (the third component). The combination of these components resulted in part B. Part B was specifically produced by mixing the components at various ratios within a temperature range of between −95 degrees centigrade and 40 degrees centigrade.

More particularly, the first component to the third component ratio was 50-50 percent by weight. The preferred temperature range was between −20 degrees centigrade and 40 degrees centigrade.

EXAMPLE III

A further alternate example discloses a blowing agent comprising quantities of methylene chloride (said third component) and one or more of n-pentane, isopentane, or cyclopentane (said second component). The combination resulted in Part C. Part C was produced by mixing the components at various ratios at a temperature range of between −95 degrees centigrade and 40 degrees centigrade.

More particularly, the third component to the second component ratio was 50-50 percent by weight. The preferred temperature range was from between −20 degrees centigrade to 40 degrees centigrade.

EXAMPLE IV

A final example discloses a blowing agent comprising quantities of methyl formate (said first component), one or more of n-pentane, isopentane, or cyclopentane (said second component), and methylene chloride (said third component). The combination of components resulted in Part D. Part D was produced by mixing the components at various ratios at a temperature range of between −95 degrees centigrade and 40 degrees centigrade.

More particularly, the first component to the second component to the third component ratio was 25-50-25 percent by weight. The preferred temperature range was from −20 degrees centigrade to 40 degrees centigrade.

Having prepared blowing agent Parts A, B, C, and D without any adverse impact on the ozone, the agents were ready for use in the production of polyurethane integral skin foam as noted below.

B. Blowing Agent Use in Production—First Alternative

The following examples disclose the preparation of a polyurethane integral skin foam according to the present invention.

EXAMPLE A

Part I was created by the mixing of 90 parts Voranol 5148, 5 parts of Voranol 490, 5 parts of 1,4-butanediol, 0.4 parts of DC5258, 0.8 parts of Dabco 33LV, 0.6 parts of PC-41, and 8 parts of Part A disclosed in Example I above.

EXAMPLE B

Example B is the same as Part I disclosed in Example A above, except that 8 parts of Part B disclosed in Example II were added in lieu of the 8 parts of Part A.

EXAMPLE C

Example C is also the same as Part I disclosed above in Example A, except that 10 parts of Part C disclosed in Example III were added in lieu of the 8 parts of Part A.

EXAMPLE D

Example D is also the same as Part I disclosed above in Example A, except that 10 parts of Part D disclosed in Example IV were added in lieu of the 8 parts of Part A.

Results

In each of Examples A, B, C, and D, a polyurethane integral skin foam product was obtained having excellent dimensional stability. The set foam in each instance had a core density of 300 kg/m$^3$ and a skin density of 900 kg/m$^3$. The thickness of the skin in each instance was between 0.2 and 0.3 cm.

C. Blowing Agent Use in Production—Second Alternative

In addition to providing a blowing agent that provides a virtually shrink-free product without damaging the ozone, the present invention further disclosed such an agent that also has excellent fire retardancy. This may be achieved by adding to Part I discussed above the following to create Part II: 30 parts of Phoschek P40 (trademark, Monsanto Co., St. Louis, Mo.), 5 parts of Fyrol PCF (trademark for tri(beta-cholorisopropyl), Akzo Chemical Inc., Chicago, Ill.), and 3 parts calcium hydroxide.

To Part II was added alternatively the blowing agents Parts A, B, C, and D. The resulting product showed the same very high dimensional stability characteristics as disclosed in the First Alternative discussed above, but in addition, provided a product that passed CA-117 regulations as tested in the vertical test.

D. Comparison Testing

The results of comparison testing between single-component blowing agents of methylene chloride and methyl formate and blowing agents according to the present invention are presented below. The tests were done to produce a rigid foam. All amounts are parts.

| Formulation (part) | Foam-1 | Foam-2 | Foam-3 |
|---|---|---|---|
| Voranol 360 | 100 | 100 | 100 |
| DC-193 | 2.5 | 2.5 | 2.5 |
| 33LV | 2.0 | 2.0 | 2.0 |
| T-12 | 0.1 | 0.1 | 0.1 |
| Blowing agent | methylene chloride | methyl formate | Examples I, II, III, IV |
| Amount of blowing agent | 25 | 20 | 20 |
| Mondur MR | 125 | 125 | 125 |
| Processing | | | |
| Cream time (seconds) | 20 | 22 | 22 |
| Rise time (seconds) | 39 | 40 | 39 |
| Tack free time (seconds) | 60 | 60 | 60 |
| Physical Properties | | | |
| Density, kg/m$^3$ | 34 | 31 | 29.8 |
| 10% compressive strength, KPa | 134 | 130 | 128 |
| Foam appearance | shrinkage | shrinkage | stable* |

*The foam blown with the blowing agent prepared in accordance with Example II demonstrated slight shrinkage.

The invention being thus described, it will be obvious that the same may be varied in many ways. Such variations are not to be regarded as a departure from the spirit and scope of the invention, and all such modifications are intended to be included within the scope of the following claims.

I claim:

1. A blowing agent having low ozone depletion potential for use in a process for preparing polyurethane foam, said blowing agent comprising:
   least one five-carbon member hydrocarbon
   a chlorinated alkane, and
   methyl formate.

2. The blowing agent of claim 1 wherein said at least one five-carbon member hydrocarbon is n-pentane.

3. The blowing agent of claim 1 wherein said at least one five-carbon member hydrocarbon is isopentane.

4. The blowing agent of claim 1 wherein said at least one five-carbon member hydrocarbon is cyclopentane.

5. The blowing agent of claim 1 wherein said chlorinated alkane is methylene chloride.

6. The blowing agent of claim 1 wherein said at least one five-carbon member hydrocarbon is provided in a quantity of about twenty to eighty percent by weight and said chlorinated alkane is provided in a quantity of about twenty to eighty percent by weight.

7. The blowing agent of claim 1 wherein said at least one five-carbon member hydrocarbon is provided in a quantity of about fifty percent by weight and said chlorinated alkane is provided in a quantity of about fifty percent by weight.

8. A blowing agent having low ozone depletion potential for use in a process for preparing polyurethane integral skin foam, said blowing agent comprising:
   at least one five-carbon member hydrocarbon,
   a chlorinated alkane, and
   methyl formate.

9. The blowing agent of claim 8 wherein said at least one five-carbon member hydrocarbon is n-pentane.

10. The blowing agent of claim 8 wherein said at least one five-carbon member hydrocarbon is isopentane.

11. The blowing agent of claim 8 wherein said at least one five-carbon member hydrocarbon is cyclopentane.

12. The blowing agent of claim 8 wherein said at least one five-carbon member hydrocarbon is provided in a quantity of about twenty to eighty percent by weight and said chlorinated alkane is provided in a quantity of about twenty to eighty percent by weight.

13. The blowing agent of claim 8 wherein said at least one five-carbon member hydrocarbon is provided in a quantity of about fifty percent by weight and said methyl formate is provided in a quantity of about fifty percent by weight.

14. A blowing agent having low ozone depletion potential for use in a process for preparing a rigid polyurethane foam, said blowing agent comprising:
   a chlorinated alkane,
   at least one five carbon member hydrocarbon, and
   a methyl formate.

15. The blowing agent of claim 14 wherein said chlorinated alkane is methylene chloride.

16. The blowing agent of claim 14 wherein said chlorinated alkane is provided in a quantity of about twenty to eighty percent by weight and said methyl formate is provided in a quantity of about twenty to eighty percent by weight.

17. The blowing agent of claim 14 wherein said chlorinated alkane is provided in a quantity of about fifty percent by weight and said methyl formate is provided in a quantity of about fifty percent by weight.

18. The blowing agent of claim 14 wherein said at least one five-carbon member hydrocarbon is provided in a quantity of about twenty to eighty percent by weight, said chlorinated alkane is provided in a quantity of about ten to forty percent by weight, and said methyl formate is provided in a quantity of about ten to forty percent by weight.

19. The blowing agent of claim 14 wherein said at least one five-carbon member hydrocarbon is provided in a quantity of about fifty percent by weight, said chlorinated alkane is provided in a quantity of about twenty-five percent by weight, and said methyl formate is provided in a quantity of about twenty-five percent by weight.

* * * * *

UNITED STATES PATENT AND TRADEMARK OFFICE
CERTIFICATE OF CORRECTION

PATENT NO. : 5,283,003
DATED : February 1, 1994
INVENTOR(S): Wen-Pin CHEN

It is certified that error appears in the above-identified patent and that said Letters Patent is hereby corrected as shown below:

```
Column 6, line 58 (claim 1), before "least" insert
    --at--; and
column 8, line 6 (claim 14), delete "a".
```

Signed and Sealed this

Twenty-sixth Day of July, 1994

Attest:

BRUCE LEHMAN

*Attesting Officer*  *Commissioner of Patents and Trademarks*